US012670154B1

(12) United States Patent
Kumar et al.

(10) Patent No.: US 12,670,154 B1
(45) Date of Patent: Jun. 30, 2026

(54) APPLICATION SELECTION FOR LANGUAGE MODELS

(71) Applicant: Amazon Technologies, Inc., Seattle, WA (US)

(72) Inventors: Vaibhav Kumar, Redmond, WA (US); Mohammad Kachuee, Bellevue, WA (US); Amin Fazeli, San Diego, CA (US); Yibo Yao, Bellevue, WA (US); Yu Chen, Manhasset, NY (US); Saurabh Gupta, Seattle, WA (US); Changmin Seo, Seattle, WA (US); Xiang Li, Bellevue, WA (US); Puyang Xu, Issaquah, WA (US); Tenghao Huang, Los Angeles, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 177 days.

(21) Appl. No.: 18/529,221

(22) Filed: Dec. 5, 2023

(51) Int. Cl.
| | |
|---|---|
| *G06F 40/30* | (2020.01) |
| *G06F 16/2452* | (2019.01) |
| *G06F 16/248* | (2019.01) |
| *G06F 16/28* | (2019.01) |

(52) U.S. Cl.
CPC ...... *G06F 16/24522* (2019.01); *G06F 16/248* (2019.01); *G06F 16/285* (2019.01)

(58) Field of Classification Search
CPC ............. G06F 16/24522; G06F 16/285; G06F 16/248; G06F 40/30; G06F 40/284
USPC .......................................................... 704/9
See application file for complete search history.

(56) References Cited

U.S. PATENT DOCUMENTS

| | | | | |
|---|---|---|---|---|
| 12,019,663 | B1 * | 6/2024 | Zhang | G06F 16/3344 |
| 12,524,403 | B2 * | 1/2026 | Barkan | G06F 16/24522 |
| 2015/0325237 | A1 * | 11/2015 | Chang | G10L 15/34 |
| | | | | 704/257 |
| 2017/0109368 | A1 * | 4/2017 | Mohajer | G10L 15/183 |
| 2022/0067304 | A1 * | 3/2022 | Luong | G06F 40/284 |
| 2023/0325358 | A1 * | 10/2023 | Mohajer | G10L 15/063 |
| | | | | 707/723 |
| 2024/0281472 | A1 * | 8/2024 | LaRhette | G06F 16/9558 |
| 2025/0005301 | A1 * | 1/2025 | DeFoor | G06N 3/0455 |

(Continued)

FOREIGN PATENT DOCUMENTS

| | | | | |
|---|---|---|---|---|
| WO | WO-2024207009 A1 * | 10/2024 | | G06F 40/30 |
| WO | WO-2025106226 A1 * | 5/2025 | | G06F 40/30 |

*Primary Examiner* — Richemond Dorvil
(74) *Attorney, Agent, or Firm* — K&L Gates LLP

(57) ABSTRACT

Devices and techniques are generally described for application shortlisting for language models. An LLM may determine a first goal of first query data. The LLM may generate first code data representing the first query data. First encoded data including a first encoded representation of the first goal and the first query data may be generated. A first application may be determined based at least in part on analysis of the first encoded data with respect to second encoded data representing the first application. A second application may be determined based at least in part on analysis of the first encoded data with respect to third encoded data representing the second application. First prompt data including the first query data, first data identifying the first application, and second data identifying the second application may be generated. The LLM may generate output data based at least in part on the first prompt data.

20 Claims, 11 Drawing Sheets

(56)     References Cited

U.S. PATENT DOCUMENTS

| | | | | |
|---|---|---|---|---|
| 2025/0077558 A1* | 3/2025 | Zhang | .................. | G06F 40/205 |
| 2025/0086235 A1* | 3/2025 | Kumar | .................... | G06N 3/08 |
| 2025/0156413 A1* | 5/2025 | Barkan | ................ | G06F 16/243 |
| 2025/0217193 A1* | 7/2025 | Wang | .................... | G06F 9/5027 |
| 2025/0284688 A1* | 9/2025 | Yakovlev | ............. | G06F 16/243 |

* cited by examiner

Input query 106

LLM 260

1. Goal 1
2. Goal 2
3. Goal 3
. . .

120

122

```
class Research_3D:
        def __init__(self):
                self.user_query = [Input user query]
                self.output = [Desired output for input user query]

def step_0(self):
                self.content = [Goal_0]
                self.task = [Task_0 to accomplish Goal_0]
                self.input = " "
                self.output = [Output for Task_0]

def step_1(self):
                self.content = [Goal_1]
                self.task = [Task_1 to accomplish Goal_1]
                self.input = [Output for Task_0]
                self.output = [Output for Task_1]

def step_2(self):
                self.content = [Goal_2]
                self.task = [Task_2 to accomplish Goal_2]
                self.input = [Output for Task_1]
                self.output = [Output for Task_2]

# Create an instance of the class
research_instance = Research_3D ()

# You can now call the methods to simulate the steps of the procedure
research_instance.step_0 ()
research_instance.step_1 ()
research_instance.step_2 ()
```

FIG. 3B

I/O Device Interfaces 592

Processing Element(s) 594

Memory 596

100

Network 504

590

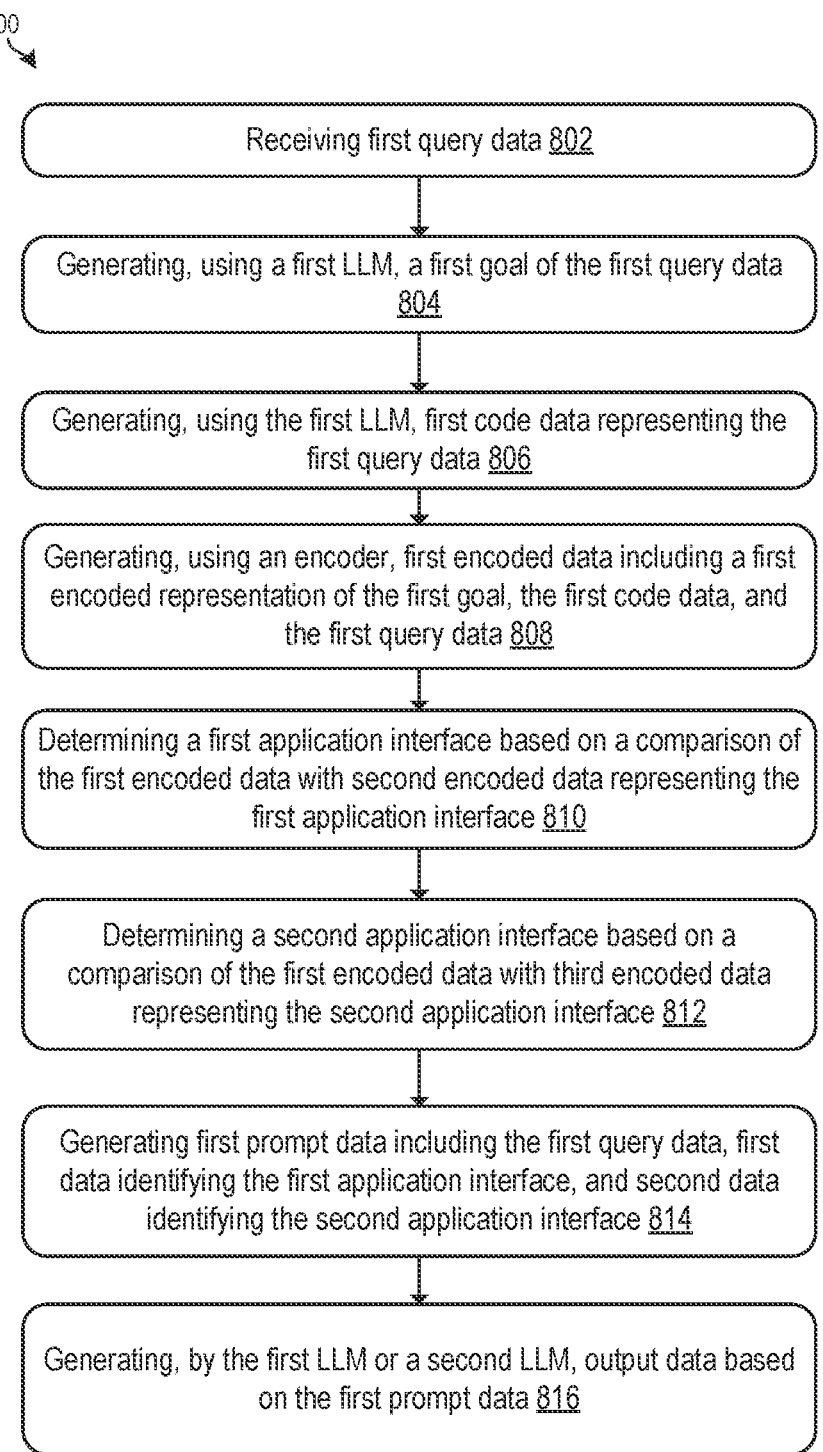

800

Receiving first query data 802

Generating, using a first LLM, a first goal of the first query data 804

Generating, using the first LLM, first code data representing the first query data 806

Generating, using an encoder, first encoded data including a first encoded representation of the first goal, the first code data, and the first query data 808

Determining a first application interface based on a comparison of the first encoded data with second encoded data representing the first application interface 810

Determining a second application interface based on a comparison of the first encoded data with third encoded data representing the second application interface 812

Generating first prompt data including the first query data, first data identifying the first application interface, and second data identifying the second application interface 814

Generating, by the first LLM or a second LLM, output data based on the first prompt data 816

FIG. 8

APPLICATION SELECTION FOR LANGUAGE MODELS

BACKGROUND

People can interact with computing devices using spoken commands. In some systems, a "wakeword" is used to activate functionality. Natural language processing is used to transform the spoken requests that follow into a computer directive for performing a task.

BRIEF DESCRIPTION OF DRAWINGS

FIG. 3B depicts an example of LLM-generated code for a natural language input query, in accordance with various aspects of the present disclosure.

FIG. 8 is a flow chart illustrating an example process for application shortlisting for an LLM-based natural language processing system, in accordance with embodiments of the present disclosure.

DETAILED DESCRIPTION

Figure 1:
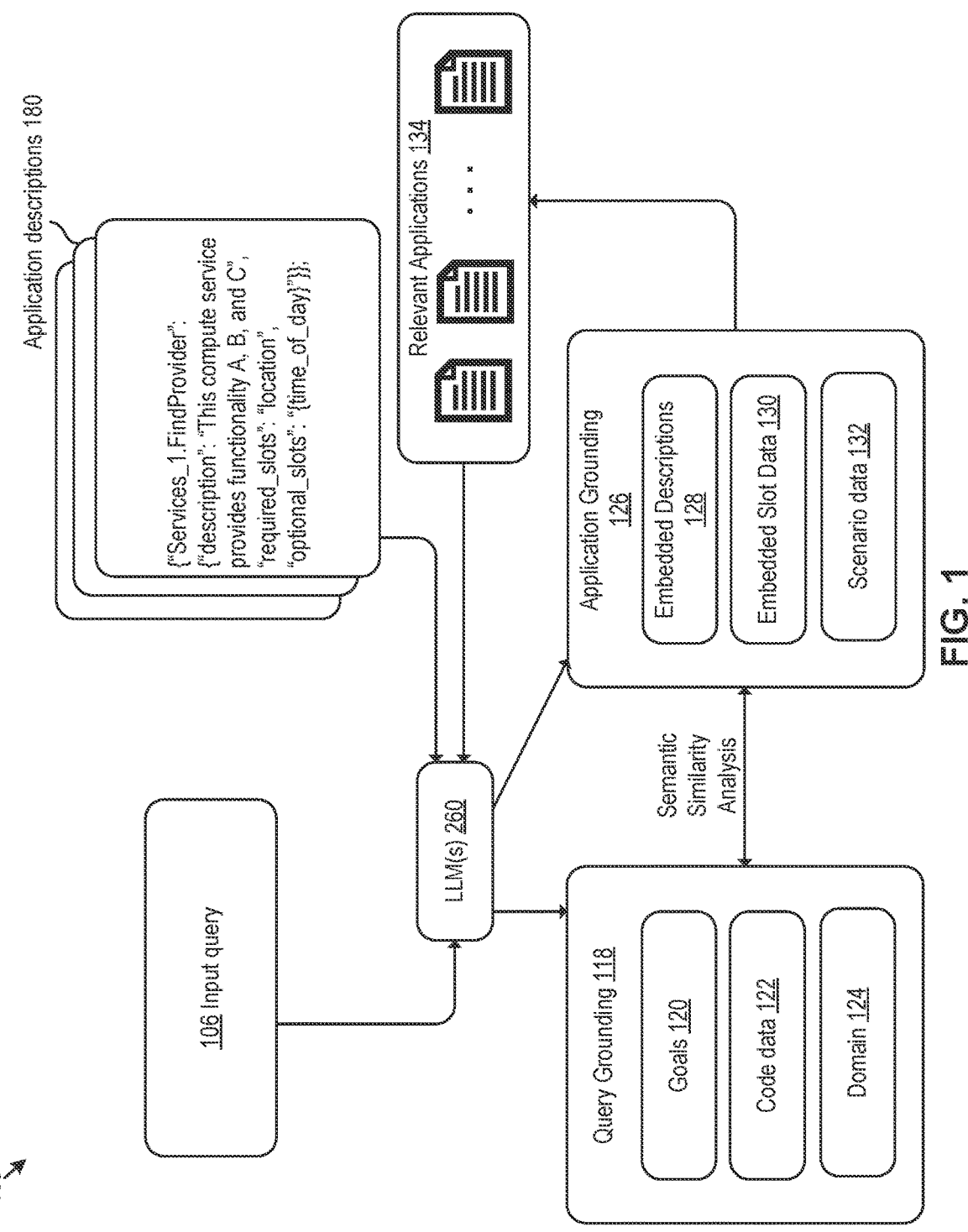
FIG. 1 is a block diagram illustrating an example application shortlister for large language model (LLM)-based processing, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Devices with integrated processing capabilities are often configured with network communication capability and/or other computing functions allowing the devices to send data to and/or receive data from other devices. In some examples, such devices may include voice-enabled personal assistants, such as computer-implemented conversational agents, and/or other natural language processing interfaces that may be used to control the devices, answer questions, communicate with other people/devices, and/or otherwise interact with the devices and/or other devices. As such devices become more and more prevalent in both the home, office, public spaces (e.g., retail spaces, public transportation), quasi-public spaces (e.g., hotels, offices, etc.), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Some natural language processing flows may employ one or more large language models (LLMs) in order to process natural language requests. An LLM is an artificial intelligence (AI) model that may be capable of processing and generating text based on the latent information it has learned from vast amounts of training data. The term "large" refers to the size of these models in terms of the number of parameters or weights, which are the values that the model learns during training to make predictions and/or generate output such as text, synthesized speech, directives for controlling other machine components, etc. LLMs may have billions, trillions, or more parameters, which enable such models to capture complex patterns and nuances in language that, in turn, allow the models to understand and generate more natural-sounding text (relative to previous approaches). LLMs are typically trained on relatively large amounts of data that include a wide variety of text from various sources, enabling the LLMs to understand grammar, context, and the relationships between words, sentences, paragraphs, etc. Examples of LLMs include the generative pre-trained transformer models (e.g., GPT-3, GPT-4), Pathways Language Model (PaLM), Large Language Model Meta Artificial Intelligence (LLaMA), as well as non-generative examples such as BERT (bidirectional encoder representations from Transformers), etc.

In a generative context, an LLM may generate text that is responsive to the input prompt provided to the LLM. LLMs can generate natural sounding text that appears as though it has been generated by a native speaker in the relevant language. In addition to fluency, generative LLMs are able to generate detailed, relevant, and largely accurate and/or creative responses to input prompts in many cases due to the large amount of latent information the generative LLM has learned during training.

In various examples described herein, LLM-based natural language processing may generate prompt data for a given input request (e.g., a text transcription of a given spoken request, generated using automatic speech recognition (ASR)). The prompt data may be augmented with various context data (a process sometimes referred to as "grounding") and may be input into the LLM. The LLM may be trained to output a text-based action plan which may be formatted into a series of computer-executable actions (including API requests (sometimes referred to as API "calls" or "directives") to various subsystems or other machine components which may or may not be part of the same system or systems as the LLM) that may be executed in order to process the natural language request. In various examples, an LLM-based processing flow may be a recursive process wherein the initial action plan may be executed (e.g., by making various application interface requests to various compute services/applications to receive results/responses), and the responses may be used to generate updated LLM prompts which may then be input into the LLM for generation of an updated action plan. For example, a user may request "What is the best restaurant located nearest to the tallest mountain in California?" The prompt data generated for this request may instruct the LLM to break the request down into a number of sub-tasks for solving the problem. The prompt data may also include various other context such as a device ID of a device used to input the request, time of day, day of year, account ID, previous turns in a current dialog session, etc.

The LLM may generate a natural language output action plan indicating that, in order to solve the problem of the request, it needs to 1) determine the tallest mountain in California, 2) determine restaurants that are near the tallest mountain in California, and 3) determine rankings for these restaurants. An action plan generator may take the natural language output of the LLM and may generate a series of computer-executable API requests to retrieve the information from various external computer-implemented services. For example, the action plan may specify a first API request to an interface of a question-and-answer service (e.g., get_answer ("What is the tallest mountain in [location-_name]", location_name(location="California")) where the application interface (e.g., the application API) takes as input the question and a location name (e.g., a "slot" value) as input parameters. An action plan executor may execute the API directive and may receive result data indicating that Mount Whitney is the tallest mountain in California. Thereafter, the result may be passed as input to a different application interface used to retrieve restaurants near a particular location. In this case, the restaurant-retrieval application interface may take the location (e.g., Mount Whitney) as the input parameter. In an example, upon receiving a list of restaurants near Mount Whitney, updated prompt data may be generated by the LLM-based natural language processing system. For example, the updated prompt may include the previous prompts, actions, and results along with a new text prompt of "Provide a ranked list of the five best restaurants among [list_of_restaurants-_returned_by_restaurant_retrieval_API]." The LLM may retrieve the list (e.g., using a restaurant ranking application interface) and may determine, using the latent information learned by the LLM during training, that the result answers the initial user-input request. Accordingly, recursion may end and the LLM may output the ranked list of restaurants.

There may be a wide variety of tools (e.g., distinct compute services) available to the LLM for processing. For example, there may be tens or even hundreds of thousands of different applications and/or compute services at an LLM's disposal. Additionally, these numbers are likely to grow over time. In some cases, an LLM may generate an application interface request that is not well-suited to performing the relevant task. This may lead to increased latency as the recursive LLM processing takes additional iterations to arrive at the desired result. In some cases, this may result in the LLM either being unable to perform the desired task. Accordingly, some approaches have attempted to compare the input query to different application descriptions in order to intelligently ground the LLM prompt with descriptions of applications that are relevant to the query. This task may be referred to, generally, as API shortlisting and/or application shortlisting. Application shortlisting is a processing step used by an LLM-based conversational agent to generate appropriate responses. In various examples described herein, an "application" may refer to a collection of computer-implemented functions and/or services as well as individual computer-implemented functions and/or services along with their interfaces (e.g., APIs), data, and/or metadata.

One approach for application shortlisting is to pose the task as information retrieval. In an information retrieval-based approach, the developer-generated description for each application may be associated with corresponding input queries. Another approach is to instead or additionally use application shortlisting for LLMs that can provide improved application shortlists for LLM-based processing. The various systems and techniques described herein may employ a multi-faceted approach for effective application shortlisting. In various examples, the LLM's reasoning ability may be used to decompose ambiguous input queries into a structured representation of tasks. In addition, the LLM's knowledge base may be used to consolidate incomplete and/or generic application descriptions for improved relevance-based retrieval. In some further examples, the various systems and techniques described herein may be used to rewrite input queries to mitigate application hallucinations and/or invalid API requests.

Automatic speech recognition (ASR) is a field of computer science, artificial intelligence, and linguistics concerned with transforming audio data associated with speech into text data and/or other ASR output data representative of that speech. In a voice assistant context, such as those described herein, ASR may be used to transform spoken utterances into text that can then serve as the input to an LLM or other language model (e.g., natural language understanding (NLU), which is a field of computer science, artificial intelligence, and linguistics concerned with enabling computers to derive meaning from text input containing natural language, resulting in specific executable command data (e.g., intent data) or other type of instructions). Text-to-speech (TTS) is a field of computer science, artificial intelligence, and linguistics concerned with enabling computers to output synthesized speech. ASR, generative language models (e.g., such as some LLMs), and TTS may be used together as part of a natural language processing system. As used in, natural language input data may comprise audio data (e.g., representing a user request or command), text data, and/or other representation data representing natural language for input into a natural language processing system.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Bard assistant or the Google Assistant system from Google LLC of Mountain View, California, Dragon speech recognition software or the Copilot system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, LLM inference, etc.). In various examples, the wakeword detection component may be used to distinguish between audio that is intended for the natural language processing system and audio that is not intended for the natural language processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Transformer models are machine learning models that include an encoder network and a decoder network. LLMs are often implemented using transformer models. The encoder takes an input (e.g., a "prompt") and generates feature representations (e.g., feature vectors, feature maps, etc.) of the input. The feature representation is then fed into a decoder that may generate an output based on the encodings. In natural language processing, transformer models take sequences of words as input. A transformer may receive a sentence and/or a paragraph (or any other quantum of text) comprising a sequence of words as an input.

The encoder network of a transformer comprises a set of encoding layers that processes the input data one layer after another. Each encoder layer generates encodings (referred to herein as "tokens"). These tokens include feature representations (e.g., feature vectors and/or maps) that include information about which parts of the input data are relevant to each other. Each encoder layer passes its token output to the next encoder layer. The decoder network takes the tokens output by the encoder network and processes them using the encoded contextual information to generate an output (e.g., the aforementioned one-dimensional vector of tokens). The output data may be used to perform task-specific functions (e.g., action plan generation for an LLM-based natural language processing flow, etc.). To encode contextual information from other inputs (e.g., combined feature representation), each encoder and decoder layer of a transformer uses an attention mechanism, which for each input, weighs the relevance of every other input and draws information from the other inputs to generate the output. Each decoder layer also has an additional attention mechanism which draws information from the outputs of previous decoders, prior to the decoder layer determining information from the encodings. Both the encoder and decoder layers have a feed-forward neural network for additional processing of the outputs, and contain residual connections and layer normalization steps.

Scaled Dot-Product Attention

The basic building blocks of the transformer are scaled dot-product attention units. When input data is passed into a transformer model, attention weights are calculated between every token simultaneously. The attention unit produces embeddings for every token in context that contain information not only about the token itself, but also a weighted combination of other relevant tokens weighted by the attention weights.

Concretely, for each attention unit the transformer model learns three weight matrices; the query weights $W_Q$, the key weights $W_K$, and the value weights $W_V$. For each token i, the input embedding $x_i$ is multiplied with each of the three weight matrices to produce a query vector $q_i = x_i W_Q$, a key vector $k_i = x_i W_K$, and a value vector $v_i = x_i W_V$. Attention weights are calculated using the query and key vectors: the attention weight $a_{ij}$ from token i to token j is the dot product between $q_i$ and $k_j$. The attention weights are divided by the square root of the dimension of the key vectors, $\sqrt{d_k}$, which stabilizes gradients during training. The attention weights are then passed through a softmax layer that normalizes the weights to sum to 1. The fact that $W_Q$ and $W_K$ are different matrices allows attention to be non-symmetric: if token i attends to token j, this does not necessarily mean that token j will attend to token i. The output of the attention unit for token i is the weighted sum of the value vectors of all tokens, weighted by $a_{ij}$, the attention from i to each token.

The attention calculation for all tokens can be expressed as one large matrix calculation, which is useful for training due to computational matrix operation optimizations which make matrix operations fast to compute. The matrices Q, K, and V are defined as the matrices where the ith rows are vectors $q_i$, $k_i$, and $v_i$ respectively.

$$\text{Attention}(Q, K, V) = \text{softmax}\left(\frac{QK^T}{\sqrt{d_k}}\right)V$$

Multi-Head Attention

One set of $(W_Q, W_K, W_V)$ matrices is referred to herein as an attention head, and each layer in a transformer model has multiple attention heads. While one attention head attends to the tokens that are relevant to each token, with multiple attention heads the model can learn to do this for different definitions of "relevance." The relevance encoded by transformers can be interpretable by humans. For example, in the natural language context, there are attention heads that, for every token, attend mostly to the next word, or attention heads that mainly attend from verbs to their direct objects. Since transformer models have multiple attention heads, they have the possibility of capturing many levels and types of relevance relations, from surface-level to semantic. The multiple outputs for the multi-head attention layer are concatenated to pass into the feed-forward neural network layers.

Each encoder comprises two major components: a self-attention mechanism and a feed-forward neural network. The self-attention mechanism takes in a set of input encodings from the previous encoder and weighs their relevance to each other to generate a set of output encodings. The feed-forward neural network then further processes each output encoding individually. These output encodings are finally passed to the next encoder as its input, as well as the decoders.

The first encoder takes position information and embeddings of the input data as its input, rather than encodings. The position information is used by the transformer to make use of the order of the input data. In various examples described herein, the position embedding may describe an order of a sequence of words.

Each decoder layer comprises three components: a self-attention mechanism (e.g., scaled dot product attention), an attention mechanism over the encodings, and a feed-forward neural network. The decoder functions in a similar fashion to the encoder, but an additional attention mechanism is inserted which instead draws relevant information from the encodings generated by the encoders. In a self-attention layer, the keys, values and queries come from the same place—in the case of the encoder, the output of the previous layer in the encoder. Each position in the encoder can attend to all positions in the previous layer of the encoder. In "encoder-decoder attention" layers (sometimes referred to as "cross-attention"), the queries come from the previous decoder layer, and the keys and values come from the output of the encoder. This allows every position in the decoder to attend over all positions in the input sequence. The decoder is attending to the encoder features.

FIG. 1 is a block diagram illustrating an example Application shortlister 100 for LLM-based processing, in accordance with various aspects of the present disclosure.

In various examples, an input device (not shown), such as a natural language processing-enabled device may be effective to receive spoken requests (e.g., via one or more microphones) and/or other natural language requests (e.g., written text) representing an input query 106. In some examples, if the input query 106 is initially provided as speech, ASR processing may be used to transform the input query 106 into text. In examples where the input query 106 is received as text, ASR may be by-passed and/or may be used to transform the input text into a format that is suitable for further processing (e.g., tokenization).

As described in further detail below (e.g., in reference to FIG. 2), the input query 106 may be used to generate prompt data for input into LLM(s) 260. The prompt data may include the original (or reformulated) input query 106 along with various context data. The goal of the Application shortlister 100 may be to generate a shortlist of n (a tunable parameter) Application descriptionApplication descriptions 180 (e.g., descriptions of n relevant Applications 134) that may be included in the input prompt as tools the LLM(s) 260 may use to process tasks represented by the input query 106. The shortlist of application descriptions (e.g., descriptions of APIs, etc.) may be selected from among the superset of Application descriptionApplication descriptions 180 (which may be all APIs available for use by the LLM(s) 260). It has been empirically shown that providing a smaller number of applications for use by an LLM during processing results in better output relative to a larger list, assuming at least one application is relevant to the task at hand. For example, an LLM prompt that is grounded using five application interface descriptions—where one of the five is relevant and the other four are randomly sampled—may generate better LLM results than a case where the LLM prompt is grounded using twenty application interface descriptions—where one of the twenty is relevant and the other nineteen are randomly sampled.

The task of the Application shortlister 100 is to select the shortlist (e.g., a subset) of n relevant applications 134 from among the Application descriptionApplication descriptions 180, given the particular input query 106. In the example of FIG. 1, the input query may be a user request like, "Get me a reservation at the best restaurant in Seattle." However, it should be noted that this is merely an example and that the API shortlisting techniques described herein may be used with any input query.

The Application shortlister 100 may comprise query grounding component 118 and Application grounding component 126. Query grounding component 118 may include various techniques, discussed in further detail below, to decompose a given input query (e.g., input query 106) into one or more goals 120. Separately, query grounding component 118 may decompose the input query 106 into code data 122 comprising a variety of tasks that may be used to carry out the request represented by the input query. Accordingly, code data 122 may be a code representation of the input query 106 and/or tasks that may be used to respond to the input query 106. In some examples, the tasks generated in the code data 122 may reflect the goals 120 determined for the specific input query. Additionally, query grounding component 118 may determine the domain of each separate goal of the goals 120.

The goals 120 may comprise natural language goals that are determined from the input query 106 by one of the LLM(s) 260 based on the LLM(s) 260's reasoning ability (determined using the latent information learned by the LLM(s) 260 during training). In various examples, an LLM 260 that has been fine-tuned for the goal determination task may be used to generate the goals for the given input query 106. For the input query 106 (e.g., "book me a reservation at the best restaurant in Seattle") the LLM 260 may generate the goals 120 that include: 1) The user wants to know the best restaurant in Seattle; 2) The user wants to book a reservation at the best restaurant in Seattle. In order to generate natural language goals of the input query, the LLM may be fine-tuned for this task. In some other examples, a pre-trained LLM may be used along with specific prompts. The prompts may instruct the LLM to determine one or more intents or goals of the user (any number may be specified) for a given input. In addition, the prompts may include other example inputs and example goals for each of the other example inputs. Accordingly, the goal-generation LLM 260 (which may or may not be the same LLM that processing the input query 106 to generate a response) may be prompted to generate goals 120. The goals 120 may be included in prompt data along with the input query 106 to provide contextual information that the LLM 260 which is processing the input query 106 may use to determine the appropriate series of actions to take in order to respond. Including the goals 120 in the prompt data may be one approach for grounding the input query 106. Such goal grounding may serve as a way to recognize the main purpose or intent of the input query 106. This allows the LLM 260 to understand what the user wants to accomplish, such as retrieving data, performing an action, seeking information about a specific subject, etc. Identifying the goals 120 of the input query 106 helps to align the application interface retrieval process of application shortlister 100 with the user's goals and expectations.

In addition, the query grounding component 118 may decompose the input query into code data 122 (e.g., pseudo-code data). This grounding decomposes a complex input query into smaller, more manageable tasks, representing such tasks in a pseudo-code structured format. An example is provided below in reference to FIG. 3B. Code data 122 allows the LLM(s) 260 to translate the user's natural language input into a structured form that can be more easily analyzed and matched with the relevant applications 134. The code data 122 assists the LLM(s) 260 in identifying the logical flow, conditional statements, and required parameters for the various tasks implicated by the input query 106. Similar to goal determination, the query grounding component 118 may generate code data 122 for a given input query 106 using a fine-tuned LLM 260 (which may not necessarily be the same LLM as used to respond to the input query 106) that is fine-tuned using example queries paired with code data 122 representing those queries. In some other examples, a pre-trained LLM 260 may be used along with exemplars comprising pairs of queries and example code data 122 for those queries. The code data 122 generated for the input query 106 may be inserted into the prompt data generated for the input query 106 as contextual information and may be used to select the relevant applications 134, as described in further detail below.

Domain data 124 may represent a domain for each of the goals 120 and/or for each of the tasks specified in the code data 122. In various examples, an LLM 260 may be prompted to classify each of the goals in order to identify per-goal domains. In some examples, the goals may be determined for the input query 106 during a first iteration of processing by LLM 260. Then, after determining the one or more goals 120, the LLM 260 may be prompted to classify those goals into one or more domains (e.g., one domain for each goal) during a second iteration of LLM processing. In some other examples, a classifier model (e.g., a neural network) may be used to classify each of the goals 120 generated by the query grounding component 118. The domain refers to identifying the specific area or field to which the goals/tasks pertain. Examples may include music, healthcare, finance, education, ranking, question-and-answer, computer science, etc. Recognizing the domain helps to narrow down the application interface search space and ensures that the retrieved relevant applications 134 are relevant to the context of the input query 106.

Application grounding component 126 may generate updated descriptions for applications (and/or their interfaces). Application descriptions (including the Application descriptionApplication descriptions 180) may describe the functionality of an application (and its associated computer-implemented service) and may, in some cases, describe the required and/or optional input parameters. Application descriptions can be written in natural language text and/or in pseudocode. Individual application descriptions are typically generated by the developer of the application and therefore vary widely in terms of descriptiveness, quality, and/or usefulness. Accordingly, application grounding component 126 leverages the power of the LLM(s) 260 to modify and/or enrich application interface descriptions leveraging the latent information learned by the LLM(s) 260 during training. The modified application descriptions may be more detailed and/or context-aware representations relative to the original application description. The modified application descriptions may explain the API's functionality and/or may define its required and/or optional parameters. In addition, the modified application descriptions may provide examples of how the API may be used. The modified application descriptions may be generated using a pre-trained LLM 260. For example, a prompt may be provided that includes an application description and/or definition along with an example modified application description (e.g., of exemplary quality). In some examples, an LLM 260 may be fine-tuned for the application description modification task. The modified application descriptions may be embedded using an encoder model (e.g., BERT) to generate embedded descriptions 128 so that this information may be used to align to the query information in order to retrieve the relevant applications 134. An example is described below in reference to FIG. 6A.

Similarly, the application grounding component 126 may identify the specific inputs and/or parameters that a given application interface (e.g., API) requires. This assists the LLM(s) 260 in determining what information and/or data the application interface requires in order to function correctly. This includes recognizing required fields, optional parameters, and understanding the data types of values that can be used. Recognizing the slots for application interfaces ensures that the input query 106 is provided with APIs that match the specific needs of the input query 106, enhancing the usability of the retrieved APIs. The slot data determined for each API may be embedded using an encoder model to generate the embedded slot data 130 so that this information may be used to align to the query information in order to retrieve the relevant applications 134. An example is provided below in reference to FIG. 6B.

Similarly, the application grounding component 126 may identify scenario data 132 that provide information on how an API can be used in actual use-cases. This includes examples such as common scenarios of API usage and/or potential integration points of the API within a specific domain or application. Understanding how an API can be applied in different contexts assists in selecting the APIs that are more aligned with the goals 120 and/or domain data 124 of the input query 106 and may thus be used in the retrieval task of determining the relevant applications 134 given the input query 106.

The n relevant applications 134 may be determined using a retrieval tool. The input query 106, the goals 120, the code data 122, and/or the per-goal domain data 124 may be encoded using an encoder (e.g., BERT, DistilBERT, etc.). This encoded data may be used to search an embedding space for the most similar application embedding data. A given application embedding may comprise data representations of the embedded descriptions 128, the embedded slot data 130, and/or scenario data 132 for that application interface. For example, cosine similarity and/or another vector similarity metric (e.g., Euclidean distance) may be used to generate similarity data (e.g., a similarity score or distance in the embedding space) by analyzing the query embedding (e.g., a high dimensional vector representing the query) with respect to application embeddings (e.g., high dimensional vectors representing the embedded descriptions 128, the embedded slot data 130, and/or scenario data 132 for a given application interface) to determine the most similar applications for the given input query 106. The top n-most similar applications may thereby be retrieved as the relevant applications 134. Thereafter, this "shortlist" of applications may be provided to the LLM(s) 260 during inference together with the input query 106 in prompt data. In other words, the shortlist of relevant applications 134 may be used to ground the prompt data. Accordingly, the LLM(s) 260 may consider the shortlist of applications (e.g., relevant applications 134) when considering how to respond to the input query 106.

Figure 2:
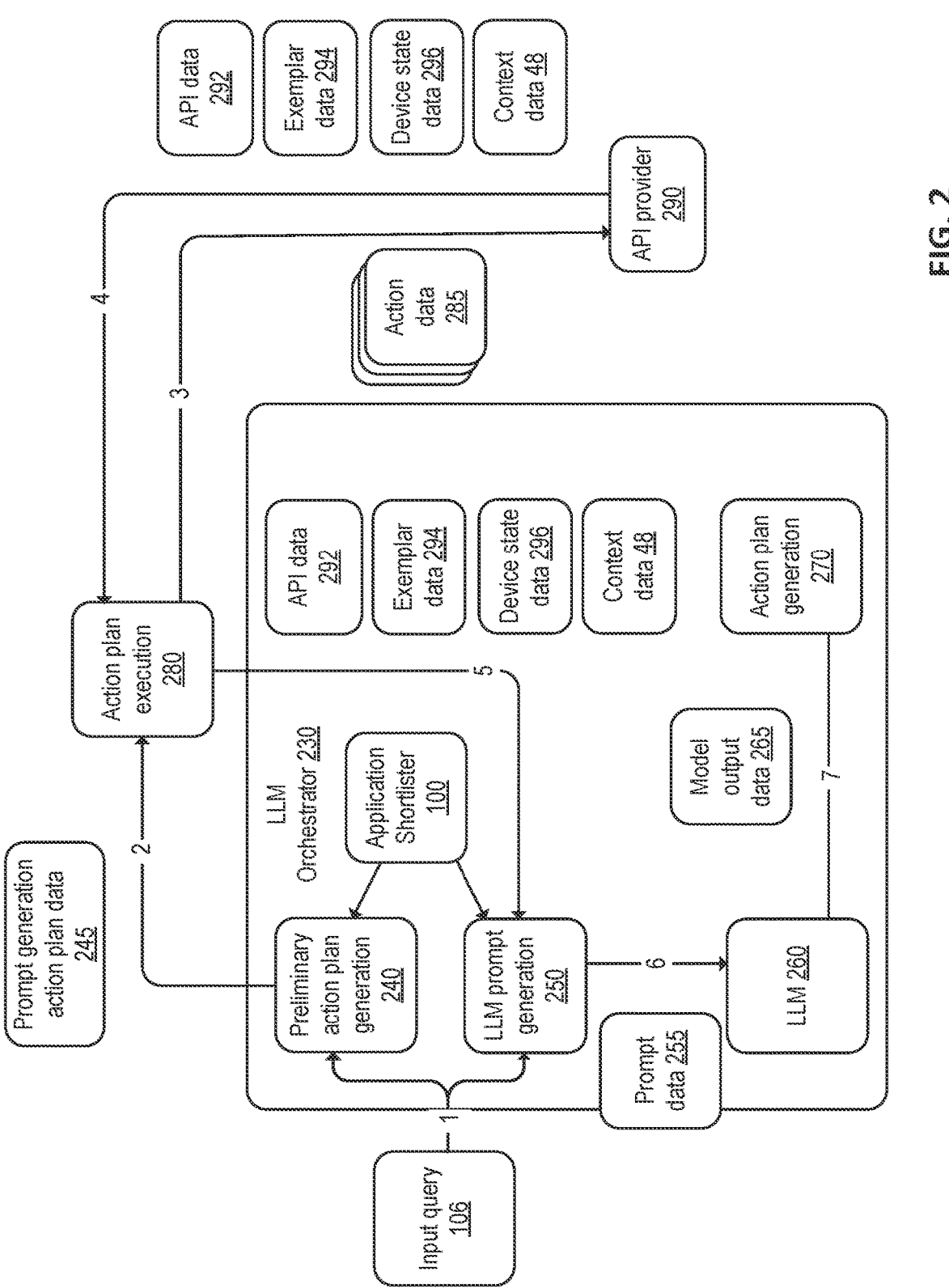
FIG. 2 depicts an example LLM-based natural language processing flow, in accordance with various aspects of the present disclosure.

FIG. 2 depicts an example LLM-based natural language processing flow, in accordance with various aspects of the present disclosure. The example architecture in FIG. 2 includes an LLM orchestrator 230 and various other components for determining an output action responsive to a user input. The architecture may further include an action plan execution component 280 and an API provider component 290. With reference to FIG. 2, the LLM orchestrator 230 may include a preliminary action plan generation component 240, a LLM prompt generation component 250, an LLM 260, and an action plan generation component 270. In various examples, the LLM 260 may be a generative model.

In some examples, the LLM 260 may be a transformer-based seq2seq model involving an encoder-decoder architecture. In some such embodiments, the LLM 260 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LLM 260 may be pre-trained with approximately 1 trillion tokens. Being trained on CLM tasks, the LLM 260 may be capable of in-context learning. An example of such a LLM is Alexa Teacher Model (Alexa™).

In various examples, the input to the LLM 260 may be in the form of a prompt (e.g., prompt data). A prompt may be a natural language input, for example, an instruction, for the LLM 260 to generate an output according to the prompt. The output generated by the LLM 260 may be a natural language output responsive to the prompt. The prompt and the output may be text in a particular spoken language. For example, for an example prompt "how do I cook beans?", the LLM 260 may output a recipe (e.g., a step-by-step process) to cook beans. As another example, for an example prompt "I am hungry. What restaurants in the area are open?", the LLM may output a list of restaurants near the user that are open at the current time.

The LLM 260 may be configured using various machine learning techniques. For example, in some embodiments, the LLM 260 may be configured (e.g., "fine-tuned") using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the LLM 260 may be configured using one-shot learning, which is similar to few-shot learning, except the model is provided with a single example. As another example, in some embodiments, the LLM 260 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

The LLM orchestrator 230 may be configured for generating the prompt to be used by the LLM 260 to determine an action responsive to a user input. As shown in FIG. 2, the LLM orchestrator 230 receives (at step 1) input query 106. In some instances, the input query 106 may correspond to a text or tokenized representation of a user input. For example, prior to the LLM orchestrator 230 receiving the input query 106, another component (e.g., an ASR component) may receive audio data representing the user input. The ASR component may perform ASR processing on the audio data to determine ASR output data corresponding to the user input. As previously described, an ASR component may determine ASR data that includes an ASR N-best list including multiple ASR hypotheses and corresponding confidence scores representing what the user may have said. The ASR hypotheses may include text data, token data, etc. as representing the input utterance. The confidence score of each ASR hypothesis may indicate the ASR component's level of confidence that the corresponding hypothesis represents what the user said. The ASR component may also determine token scores corresponding to each token/word of the ASR hypothesis, where the token score indicates the ASR component's level of confidence that the respective token/word was spoken by the user. The token scores may be identified as an entity score when the corresponding token relates to an entity. In some instances, the input query 106 may include a top scoring ASR hypothesis of the ASR data.

As illustrated in FIG. 2, the input query 106 may be received at the preliminary action plan generation component 240 and the LLM prompt generation component 250 of the LLM orchestrator 230. The preliminary action plan generation component 240 processes the input query 106 to generate prompt generation action plan data 245 corresponding to an instruction(s) (e.g., a request(s)) for one or more portions of data usable to generate a language model prompt for determining an action responsive to the user input). The preliminary action plan generation component 240 and/or the LLM prompt generation component 250 may also be implemented as LLMs or other language models configured to augment the input query 106 with relevant information that assists the LLM 260 in completing the task represented by the input query 106. In some examples, the preliminary action plan generation component 240 may determine one or more portions of data that is determined to be relevant for processing of the user input. The one or more portions of data may represent one or more actions (e.g., API definitions), one or more exemplars corresponding to the actions (e.g., example model outputs including an appropriate use of the API), one or more device states corresponding to one or more devices associated with the user input, and/or one or more other contexts associated with the user input. For example, if the input query 106 represents a user input of "please turn on the kitchen lights every morning at 7 am," then the preliminary action plan generation component 240 may determine prompt generation action plan data 245 representing instructions for one or more actions (e.g., API definitions) related to turning on the kitchens lights every morning, one or more exemplars corresponding to the related actions, one or more device states corresponding to one or more devices associated with the "kitchen lights", and one or more other contexts. For further example, if the input query 106 represents a user input of "What is the elevation of Mt. Everest," then the preliminary action plan generation component 240 may determine prompt generation action plan data 245 representing instructions for one or more actions (e.g., API definitions, specifications, schemas) related to the user input and one or more exemplars corresponding to the related actions, as other information, such as devices states or other contextual information (user profile information, device profile information, weather, time of day, historical interaction history) may not be relevant. As shown, the application shortlister 100 may determine a list of the n most relevant applications 134 given the input query 106 using the techniques described in reference to FIG. 1 (and described in additional detail below). The list of the n most relevant applications 134 may be provided to the preliminary action plan generation component 240 and/or the LLM prompt generation component 250 and may be included in the prompt data 255 and/or the prompt generation action plan data 245 to allow the LLM 260 to consider the most relevant applications 134 when determining how to respond to the input query 106.

In some examples, the prompt generation action plan data 245 may include one or more executable API calls usable for retrieving the one or more portions of data from the corresponding component. For example, instructions included in the prompt generation action plan data 245 may include "FETCH API," "FETCH_EXEMPLAR," "FETCH_DE-VICE_STATE," "FETCH_CONTEXT," etc., along with optional API arguments/inputs. In some embodiments, the prompt generation action plan data 245 may also include the input query 106. The prompt generation action plan data 245 may be sent (at step 2) to the action plan execution component 280.

In some examples, the preliminary action plan generation component 240 may be configured to process the input query 106 to determine a representation of the user's request. In various examples, the representation of the user's request may be a reformulation of the user's request. For example, the if the input query 106 represents a user input of "I have always wanted to travel to Japan, I have heard it's beautiful. How tall is Mt. Fuji?", then the preliminary action plan generation component 240 may determine the representation of the user's request as being "How tall is Mt. Fuji," or the like. The preliminary action plan generation component 240 may generate the prompt generation action plan data 245 using the determined representation of the user's request.

In some examples, the preliminary action plan generation component 240 may implement one or more machine learning (ML) models. A first ML model(s) may be configured to take as input the input query 106 and generate a representation of the user's request. For example, the ML model may be a text summarization model or a text rewrite model. A second ML model (or the first ML model) may be configured to take as input the representation of the user's request (or the input query 106) and determine the one or more portions of data relevant for processing of the user input. For example, the second ML model may be a classifier trained to classify the user's request (or the input query 106) to determine data (or types of data) relevant to the processing of the user input (e.g., one or more related actions (e.g., API definitions), one or more exemplars corresponding to the one or more related actions, one or more device states corresponding to one or more related devices, one or more related contexts, etc.)

In other embodiments, the preliminary action plan generation component 240 may be an LLM, similar to the LLM 260. In such embodiments, the architecture (e.g., LLM 80) may include a further component configured to generate a prompt to be provided to the LLM (e.g., similar to the LLM prompt generation component 250) or the prompt may be generated by the LLM prompt generation component 250. The component may generate a prompt (e.g., according to a template) including the input query 106 and instructions to determine the one or more portions of data (or types of data) relevant to the processing of the user input. The LLM may process the prompt and generate model output data representing the one or more portions of data (or types of data). The preliminary action plan generation component 240 may process the model output data to determine the prompt generation action plan data 245.

The action plan execution component 280 may process the prompt generation action plan data 245 to execute the one or more instructions to retrieve/receive data corresponding to the user input and that may be used to generate the language model prompt. As shown in FIG. 2, the action plan execution component 280 processes the prompt generation action plan data 245 to generate action data 285 representing an action included in the prompt generation action plan data 245 (e.g., a single instruction, such as FETCH_CONTEXT). For example, in the situation where the action is represented by an API call, the action data 285 may represent the action plan execution component 280 executing the API call included in the prompt generation action plan data 245. The action data 285 may be sent (at step 3) to the API provider component 290. In the situation where the prompt generation action plan data 245 includes more than one instruction, the action plan execution component 280 may generate more than one instance of action data 285 (e.g., one instance for each instruction included in the prompt generation action plan data 245) and send each instance to the API provider component 290.

The API provider component 290 may process the (one or more instances of the) action data 285 and cause the retrieval of the (one or more portions of) data associated with the action data 285. The API provider component 290 may include a knowledge provider component. The knowledge provider component may include an API retrieval component, an exemplar retrieval component, a device state retrieval component, and "other" context retrieval component. The knowledge provider component may provide the action data 285 to the component(s) configured to determine the data corresponding to the request(s) represented by the action data 285.

For example, the API retrieval component (not shown) may process the action data 285 to generate API data 292 representing one or more APIs that correspond to an action performable with respect to the user input. For example, if the user input corresponds to "turn on the kitchen light," the API retrieval component may determine an API usable to control a device and include an API definition corresponding to the API in the API data 292. In some embodiments, the API definition may include one or more API call frameworks for instructing/requesting that the API perform an action (e.g., turn_on_device (device: [device name]), turn_off_device (device: [device name]), set_device_temperature (device: [device name]); temperature: [temperature], set_device_volume (device: [device name]; volume: [volume value]), etc.). In some embodiments, the API definition may include a natural language description of the functionality of the API (e.g., a natural language description of the actions performable by the API/API call framework). For example, for the abovementioned API determined to be associated with the user input of "turn on the kitchen light," the API definition may further include a natural language description of "used to power on a device." In some embodiments, the one or more API definitions may be included in the API data 292 based on them being semantically similar to the user input. For example, the API retrieval component may be capable of comparing (e.g., using cosine similarity) (an encoded representation of) the user input to (an encoded representation of) the API definition to determine a semantic similarity between the user input and the API definition (e.g., a semantic similarity between the user input and the natural language description of the functionality of the API included in the API definition). If the API definition is determined to be semantically similar to the user input, then the corresponding API definition may be included in the API data 292. In some embodiments, the API retrieval component may include the top-n identified API definitions in the API data 292. The API data 292 may be sent (at step 4) to the action plan execution component 280 as shown in FIG. 2.

For further example, the exemplar retrieval component may process the action data 285 to generate exemplar data 294 representing one or more exemplars associated with one or more APIs (e.g., the API represented by the API data 292). As used herein, an "exemplar" associated with an API corresponds to an example use of the API (e.g., an example language model output including use of the API (e.g., via a corresponding API call) with respect to a user input, where the user input is similar to the current user input. For example, for an API associated with the API call framework "turn_on_device (device: [device name])," and the current user input "please turn on the kitchen lights" the exemplar retrieval component may select an exemplar including the example user input of "please turn on the lights" and the API call of "turn_on_device (device="lights")." In some embodiments, an exemplar represented in the exemplar data 294 may include an example user input, a natural language description of an action associated with the example user input, an executable API call associated with the example user input and the action associated with the example user input, an example result of the API call, a natural language description of an action to be performed in response to the example result of the API call, and/or an output responsive to the user input. For example, for an API associated with the API call frameworks "Routine.create_turn_on_action(device: str)" and "Routine.create_time_trigger(hour: [hour value])" and the current user input "please turn on the kitchen light everyday at 7 am," the exemplar retrieval component may select an exemplar representing:

```
{
Customer: turn on the kitchen light everyday at 7am
Thought: the customer is trying to create a routine
Action:
Routine.create_routine(trigger=Routine.create_time_trigger(hour=
7), action=Routine.create_turn_on_action(device="kitchen light"))
Observation: routine created successfully
Thought: time to respond
Response: I have created a routine for you. Anything else?
}
```

Although not illustrated in FIG. 2, in some embodiments, the API provider component 290 and/or a knowledge provider component may provide the exemplar retrieval component with the action data 285 and a list of API call(s) to which the determined exemplars are to be associated (e.g., the API call(s) included in the API data 292). In some embodiments, the one or more exemplars may be included in the exemplar data 294 based on them being semantically similar to the user input. For example, the exemplar retrieval component may be capable of comparing (e.g., using cosine similarity) the current user input to the example user input included in an exemplar to determine a semantic similarity between the current user input and the example user input. If the example user input is determined to be semantically similar to the current user input, then the corresponding exemplar may be included in the exemplar data 294. In some embodiments, the exemplar retrieval component may include the top-n identified exemplars in the exemplar data 294. The exemplar data 294 may be sent (at step 4) to the action plan execution component 280 as shown in FIG. 2.

As another example, a device state retrieval component (not shown in FIG. 2) may process the action data 285 to generate device state data 296 representing one or more states of one or more devices associated with/relevant to the user input (e.g., whether the device is powered on or off, a volume level associated with the device, etc.). For example, if the user input corresponds to "Please turn on the kitchen light," the device state data 296 may represent the state(s) of one or more devices that are associated with a functionality of turning on a light, are associated with the kitchen, are associated with a user profile of a user who provided the user input, etc. In some embodiments, the device(s) may be determined to be relevant based on a device location(s). For example, devices (e.g., microwave, oven, fridge, smart speaker, etc.) near the user device (e.g., located in the kitchen) that received the user input may be used to determine the device state data 296. In some embodiments, the one or more devices may be determined to be relevant to the user input based on device profile information. For example, the device state retrieval component may be capable of comparing device profile information for a device (e.g., device ID, device group ID, a location associated with the device, etc.) to the user input to determine whether the device is relevant to the user input. In some embodiments, the device state retrieval component may include the top-n identified device states in the device state data 296. The device state data 296 may be sent (at step 4) to the action plan execution component 280 as shown in FIG. 2.

As a further example, a context retrieval component (not shown) may process the action data 285 to generate other context data 48 (apart from the device state data 296, the API data 292, the exemplar data 294, etc.) representing one or more contexts associated with/relevant to the user input. For example, the other context data 48 may represent user profile information (age, gender, associated devices, user preferences, etc.), visual context (e.g., content being displayed by devices associated with the user profile, content being displayed by the user device that captured the user input, etc.), knowledge context (e.g., one or more previous user inputs and/or system generated responses, etc.), time of day, geographic/device location, weather information, etc. In some embodiments, the other context retrieval component 48 may include the top-n identified context in the other context data 48. The other context data 48 may be sent (at step 4) to the action plan execution component 280 as shown in FIG. 2.

In some embodiments, the knowledge provider component may be configured to cause one or more of the API retrieval components, the exemplar retrieval component, the device state retrieval component, and the other context retrieval component to process based on the data output by one or more of the components of the knowledge provider component. For example, if the output of the API retrieval component (e.g., the API data 292) indicates that a related API definition was identified, then the knowledge provider component (or another component) may cause the exemplar retrieval component to process to determine one or more exemplars related to the identified API definitions. For further example, if the output of the API retrieval component (e.g., the API data 292) indicates that a particular API definition was identified (e.g., an API definition for controlling a device), then the knowledge provider component may cause the exemplar retrieval component to process as described above, and may further cause the device state retrieval component and/or the other context retrieval component to process to determine device states for one or more related devices and/or other contextual information based on the identified API definition being associated with controlling a device. In some embodiments, the knowledge provider component may determine to cause the components to process based on instruction(s) included in the action data (e.g., based on a determination made by preliminary action plan generation component 240, as discussed above).

The action plan execution component 280 may send (step 5) the data received from the API provider component 290 (e.g., the API data 292, the exemplar data 294, the device state data 296, and the other context data 48) to the LLM prompt generation component 250. The LLM prompt generation component 250 may be configured to generate prompt data 255 (e.g., using the input query 106, the API data 292, the exemplar data 294, the device state data 296, and/or the other context data 48) to be used by the LLM 260.

In some examples, the LLM prompt generation component 250 may generate the prompt data 255 representing a prompt for input to the LLM 260. In some embodiments, such prompt data 255 may be generated based on combining the input query 106, the API data 292, the exemplar data 294, the device state data 296, and the other context data 48. The prompt data 255 may be an instruction to determine an action(s) responsive to the input query 106 given the other information (e.g., the API data 292, the exemplar data 294, the device state data 296, the other context data 48) included in the prompt data 255. In some embodiments, the LLM prompt generation component 250 may also include in the prompt data 255 a sample processing format to be used by the LLM 260 when processing the prompt and generating the response. In some embodiments, the prompt data 255 may be generated according to a template format. For example, the prompt data 255 may adhere to a template format of:

```
{
You have access to the following API's:
[API(s) (e.g., the API data 192)]
Use the following format:
User: the input utterance of a user
Thought: optionally think about what to do
Action: take an action by calling APIs
Observation: what the API execution returns
... (this thought/action/action input/observation can repeat N times)
Thought: done
Response: the proper response to the user (end of turn)
Examples:
[Exemplar(s) (e.g., the exemplar data 294)]
Context: [device state(s) (e.g., the device state data 296)] [other context(s) (e.g., the other context data 48)]
User: [the user input (e.g., the input query 106)]
}
```

In some examples, the template format may instruct the LLM 260 as to how it should process to determine the action responsive to the user input and/or how it should generate the output including the action response to the user input. For example, as shown in the example above, the format may include the label "User:" labelling the following string of characters/tokens as the user input. For further example, the format may include the label "Thought:" instructing the LLM 260 to generate an output representing the determined interpretation of the user input by the LLM 260 (e.g., the user is requesting [goal of the user input], the user is trying to [goal of the user Input], etc.) As another example, the format may include the label "Observation:" labeling the following string of characters/tokens as the result of performance of an action determined by the LLM 260/the LLM 260's interpretation of the result of the performance of the action determined by the LLM 260. As a further example, the format may include a label of "Response:" instructing the LLM 260 to generate a response (e.g., a natural language output for a user) to the prompt.

Following such a template format, for example, and for a user input of "turn on the living room light" and corresponding API data, exemplar data, device state data, and other context data, the LLM prompt generation component 250 may generate example prompt data 255*a*:

```
{
You have access to the following API's:
Routine.turn_on_device (device: [device name]) turns a device on.
Use the following format:
User: the input utterance of a user
Thought: optionally think about what to do
Action: take an action by calling APIs
Observation: what the API execution returns
... (this thought/action/action input/observation can repeat N times)
Thought: done
Response: the proper response to the user (end of turn)
Examples:
User: turn on all indoor lights
Thought: the user is trying to turn lights on
Action: turn_on_device (device-"indoor light 1")
turn on_device (device="indoor light 2")
Observation: success success
Thought: time to respond
Response: Anything else I can help you with?
Context: the user has the following devices, bathroom light,
bedroom light, kitchen light, and living room light.
User: turn on the living room light.
}
```

In some embodiments, the LLM prompt generation component 250 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The LLM 260 processes the prompt data 255 to generate model output data 265 representing an action responsive to the user input. For example, based on processing the example prompt data provided above, the LLM 260 may output model output data 265: {"Thought: the user is trying to turn on the living room light; Action: turn_on_device (device="living room light"),"} or the like. The model output data 265 is sent (at step 7) to the action plan generation component 270. The action plan generation component 270 may parse the model output data 265 to determine action plan data representing the action generated by the LLM 260. For example, for the model output data 265: "Action: turn_on_device (device="living room light")," the corresponding action plan data may correspond to "turn_on_device (device="living room light")" (e.g., corresponding to the action generated by the LLM 260, without the label of "Action"). In some embodiments, the action plan generation component 270 may determine an API call corresponding to the "Action" data included in the model output data 265. For example, in some embodiments, the action plan generation component 270 may fill in the arguments/inputs, if any, for the API call, which may be included in the action plan data. For further example, in some embodiments, the action plan execution component 280 may fill in the arguments/inputs, if any, for the API call.

In some embodiments, the LLM orchestrator 230 (e.g., the action plan generation component 270 or another component of the LLM orchestrator 230) may determine whether the LLM 260 output satisfies certain conditions. Such conditions may relate to checking whether the output includes biased information (e.g., bias towards a protected class), harmful information (e.g., violence-related content, harmful content), profanity, content based on model hallucinations, etc. A model hallucination refers to when a model (e.g., a language model) generates a confident response that is not grounded in any of its training data. For example, the model may generate a response including a random number, which is not an accurate response to an input prompt, and then the model may continue to falsely represent that the random number is an accurate response to future input prompts. To check for an output being based on model hallucinations, the LLM orchestrator 230 may use a knowledge base, web search, etc. to fact-check information included in the output.

Figure 3A:
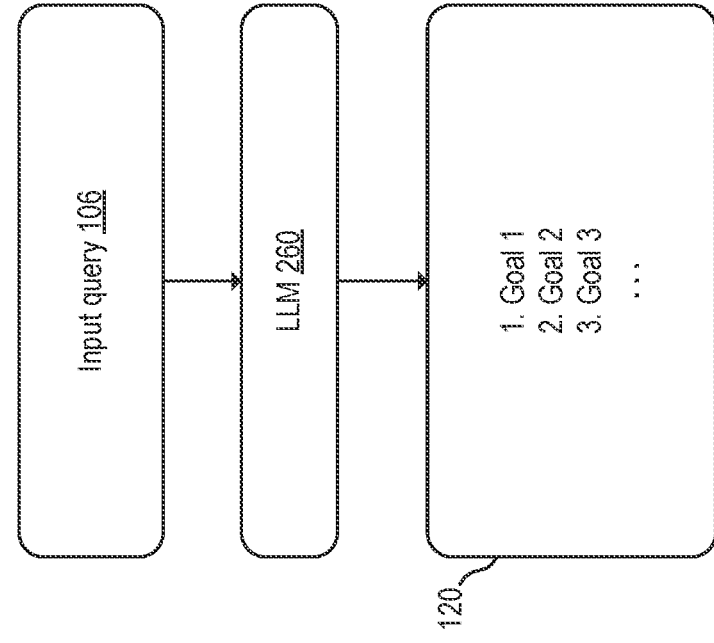
FIG. 3A depicts an example of query grounding, in accordance with various aspects of the present disclosure.

FIG. 3A depicts an example of query grounding, in accordance with various aspects of the present disclosure. In the example of FIG. 3A, the input query 106 may be a request to find the partial derivative of an equation (e.g., find the partial derivative of $f(x, y)=x^2y$ with respect to x). In this example, LLM 260 may have been prompted to determine three or more different goals of the input query 106. As previously described, LLM 260 may be fine-tuned for intent determination, by providing training examples that include queries paired with one or more goals for those queries. In some other examples, a pre-trained LLM 260 may be used and the LLM may be prompted to provide the goals of the queries. An example of such a prompt may be, "Given the query [input query], list one or more goals of the query. intent goal is a user's intent or the main purpose of the request represented by the query." Any number of goals may be specified in the prompt. In the example depicted in FIG. 3A, the generated goals 120 may include:

1. The query seeks to understand the answer to a problem.
2. The query seeks to learn the process of finding derivatives in calculus.
3. The query seeks to apply the derivative to solve a problem or understand a concept.

These goals may be embedded (e.g., using an encoder model, such as BERT, DistilBERT, etc.) and may be used (e.g., together with the other query grounding data generated by the query grounding component 118) to retrieve the n most relevant APIs for the input query 106.

FIG. 3B depicts an example of LLM-generated code data 122 for a natural language input query, in accordance with various aspects of the present disclosure. A specific example of an input query in accordance with FIG. 3B, may be the instruction, "Conduct research on the advances and benefits of 3D printing in medicine." The code generation grounding task decomposes the complex input query into smaller, more manageable tasks, representing such tasks in a pseudo-code structured format. Code data 122 allows the LLM(s) 260 to translate the user's natural language input into a structured form that can be more easily analyzed and matched with the relevant Applications 134. The code data 122 assists the LLM(s) 260 in identifying the logical flow, conditional statements, and required parameters for the various tasks implicated by the input query 106. Similar to goal determination, the query grounding component 118 may generate code data 122 for a given input query 106 using a fine-tuned LLM 260 (which may not necessarily be the same LLM as used to respond to the input query 106) that is fine-tuned using example queries paired with code data 122 representing those queries. In some other examples, a pre-trained LLM 260 may be used along with exemplars comprising pairs of queries and example code data 122 for those queries. The code data 122 generated for the input query 106 may be inserted into the prompt data generated for the input query 106 as contextual information and may be used to select the relevant Applications 134, as described in further detail below.

An example of the code data 122 may be:
```
class Research_3D_Printing_in_Medicine:
    def_init_(self):
```

```
        self.user_query="Conduct research on the advances
            and benefits of 3D printing in medicine."
        self.output="A report summarizing the advances and
            benefits of using 3D printing in medical applica-
            tions."
    def step_0(self):
        self.content="Conduct research on the advances and
            benefits of 3D printing in medicine."
        self.task="Gather relevant information from repu-
            table sources."
        self.input=" "
        self.output="A collection of research papers,
            articles, and resources."
    def step_1(self):
        self.content="Analyze the collected information and
            identify the key information."
        self.task="Identify trends, breakthroughs, and
            advantages of 3D printing in medicine."
        self.input="A collection of research papers, articles,
            and resources."
        self.output="A list of key advances and benefits of
            using 3D printing in medicine."
    def step_2(self):
        self.content="Create a comprehensive report sum-
            marizing the findings."
        self.task="Compile the identified advances and ben-
            efits into a structured report."
        self.input="A list of key advances and benefits of
            using 3D printing in medicine."
        self.output="A detailed report highlighting the
            advances and benefits of using 3D printing in
            medicine."
    # Create an instance of the class
    research_instance=Research_3D_Printing   in_Medicine
        ( )
    # You can now call the methods to simulate the steps of
        the procedure
    research_instance.step_0 ( )
    research_instance.step_1 ( )
    research_instance.step_2 ( )
```

In the above example of FIG. 3B, the complex input query has been decomposed into three tasks (e.g., step_0, step_1, and step_2) which are defined as executable methods (e.g., functions). Each step comprises a task, an input and an output. Note that the input to a subsequent task is the output from the prior task (i.e., self.input for step_1 is self.output from step_0).

The code data 122 may be embedded (e.g., using an encoder model, such as BERT, DistilBERT, etc.) and may be used (e.g., together with the other query grounding data generated by the query grounding component 118) to retrieve the n most relevant APIs for the input query 106.

Figure 4:
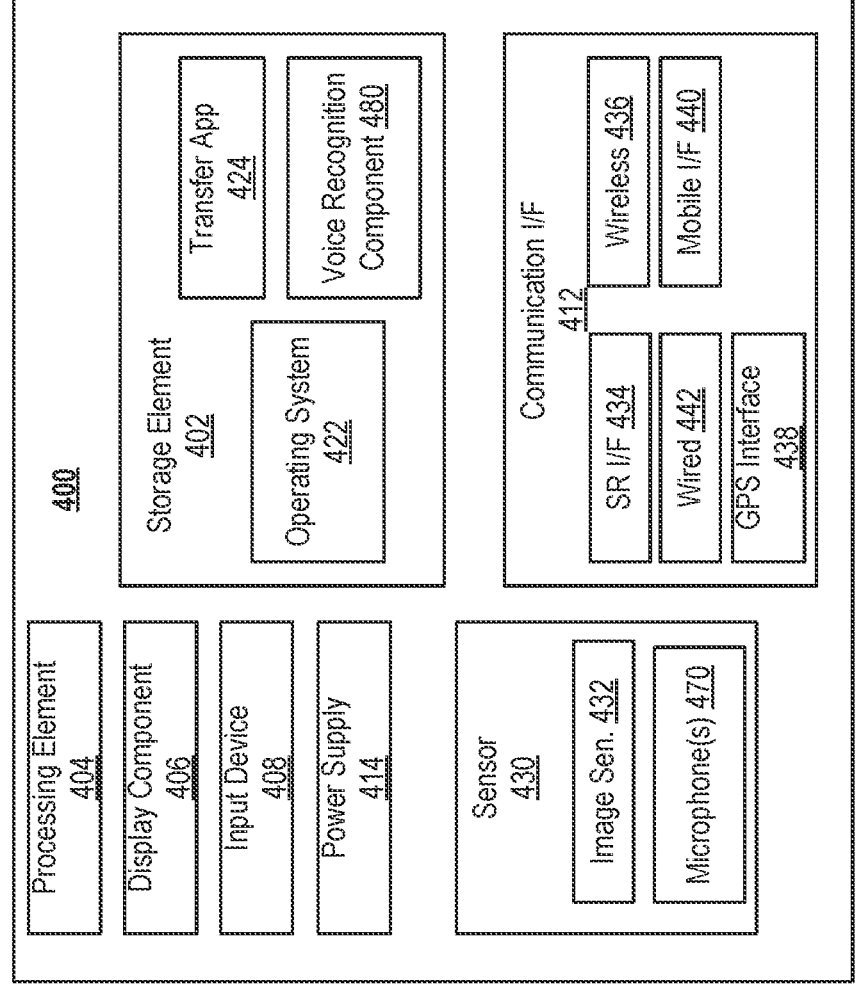
FIG. 4 is a block diagram showing an example architecture of a network-connected device that may be used in accordance with various embodiments described herein.

FIG. 4 is a block diagram showing an example architecture 400 of a network-connected device (e.g., a local network-connected device such as natural language processing-enabled device used to receive an input query 106 or another input device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor.

Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise one or more components of the API shortlister system 100.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication component 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication component 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
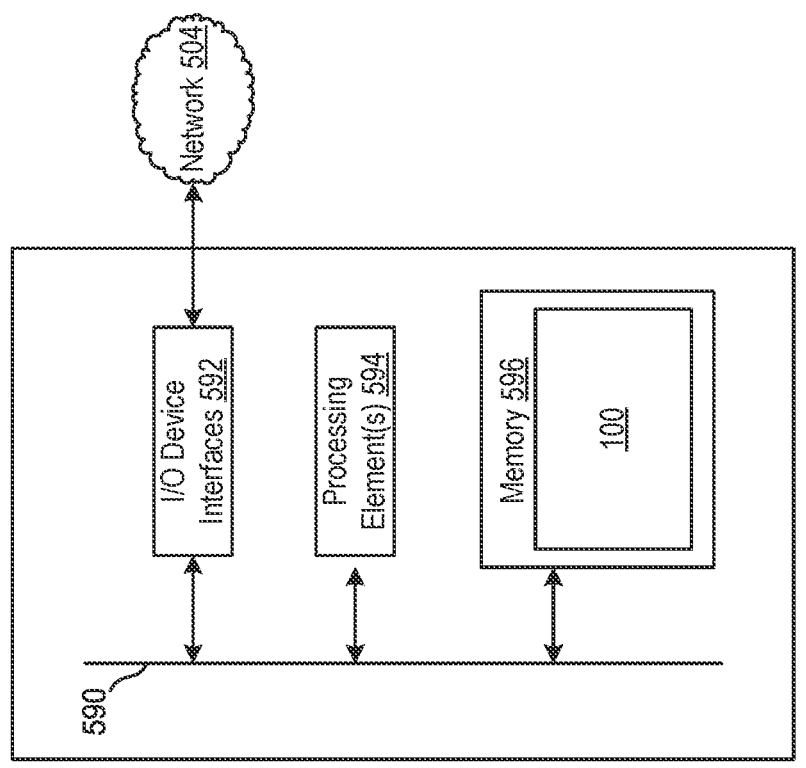
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. For example, the various components of FIG. 5 may be used to implement the Application shortlister 100. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a shortlist of applications that may be determined for particular input query data. In some examples, memory 596 may store machine learning models of the LLM 80, such as machine learned models associated with various classifiers and/or natural language inference models (described in reference to FIG. 1), when loaded from memory 596. In various further examples, memory 596 may be effective to store instructions effective to program controllers/processors 594 to perform the various techniques described above in reference to FIGS. 1-3B. Accordingly, in FIG. 5, the Application shortlister 100 for LLM processing is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of a natural language processing system may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of the various computing devices described herein may include input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6A:
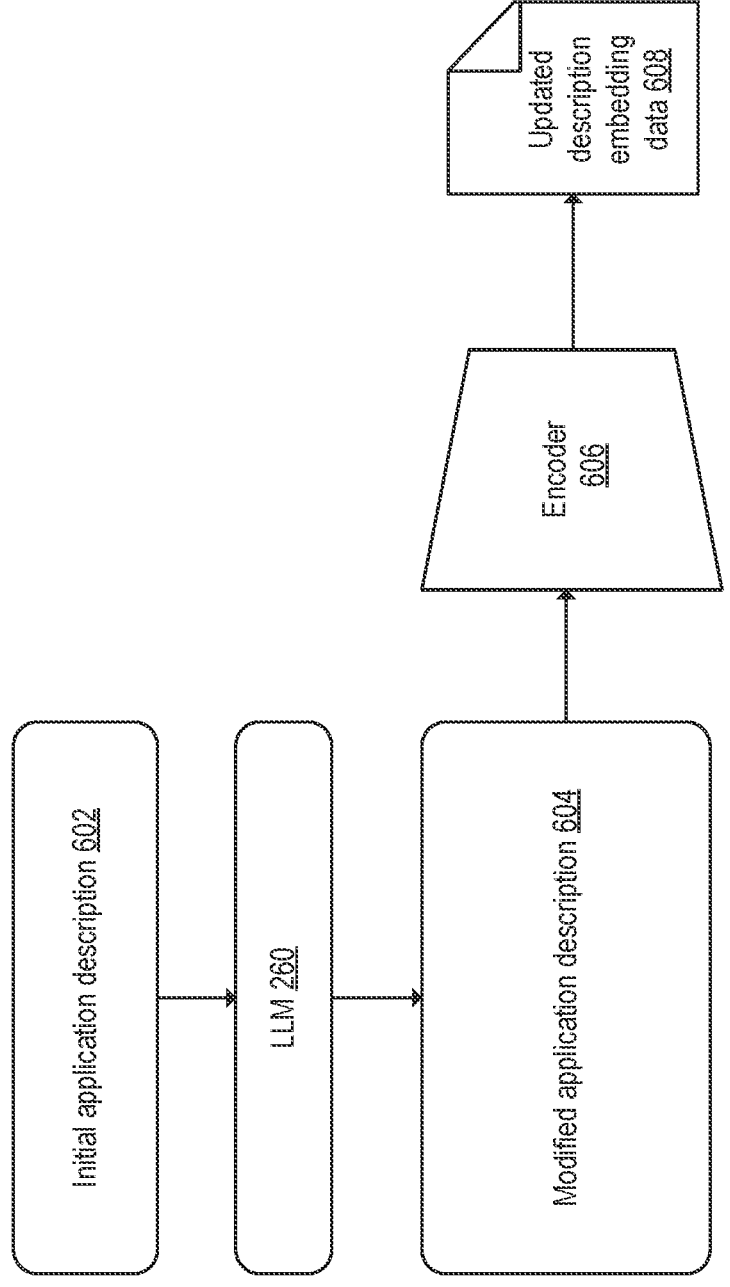
FIG. 6A depicts an example of application description grounding in accordance with various aspects of the present disclosure.

FIG. 6A depicts an example of application description grounding in accordance with various aspects of the present disclosure. Application grounding component 126 may generate updated descriptions for APIs. Application descriptions (including the application descriptions 180) may describe the functionality of an application interface (and its associated computer-implemented service) and may, in some cases, describe the required and/or optional input parameters. Application descriptions can be written in natural language text and/or in pseudocode. Individual application descriptions are typically generated by the developer of the application interface and therefore vary widely in terms of descriptiveness, quality, and/or usefulness. For example, application description 602 may be related to a math solver application (e.g., Get_MathSolverResults( )) and may have a very brief and generic description such as "Get dynamic results from Math Solver."

Application grounding component 126 leverages the power of the LLM(s) 260 to modify and/or enrich application descriptions leveraging the latent information learned by the LLM(s) 260 during training. The modified application descriptions may be more detailed and/or context-aware representations relative to the original application description. The modified application descriptions may explain the API's functionality and/or may define its required and/or optional parameters. In addition, the modified application descriptions may provide examples of how the application interface may be used. The modified application descriptions may be generated using a pre-trained LLM 260. For example, a prompt may be provided that includes an application description and/or definition along with an example modified application description. In some examples, an LLM 260 may be fine-tuned for the application description modification task. The modified application descriptions may be embedded using an encoder 606 (e.g., BERT) to generate embedded descriptions 128 so that this information may be used to align to the query information in order to retrieve the relevant applications 134. In the example of FIG. 6A, the modified application description 604 for the application interface Get_MathSolverResults( ) may be "This tool provides users with access to Math Solver's vast knowledge base, enabling them to obtain detailed answers, perform complex calculations, solve equations, and gain deep insights into various domains, such as research."

The modified application description 604 may be encoded by encoder 606 to generate the updated description embedding data 608. This updated description embedding data 608 may be stored in memory and may be retrieved for a given input query as one of the shortlist of n relevant applications 134. Upon retrieval, the modified application description 604 may be added to the prompt for the LLM 260 to assist the LLM 260 in deciding whether to use the API to take some action in response to the input query 106.

Figure 6B:
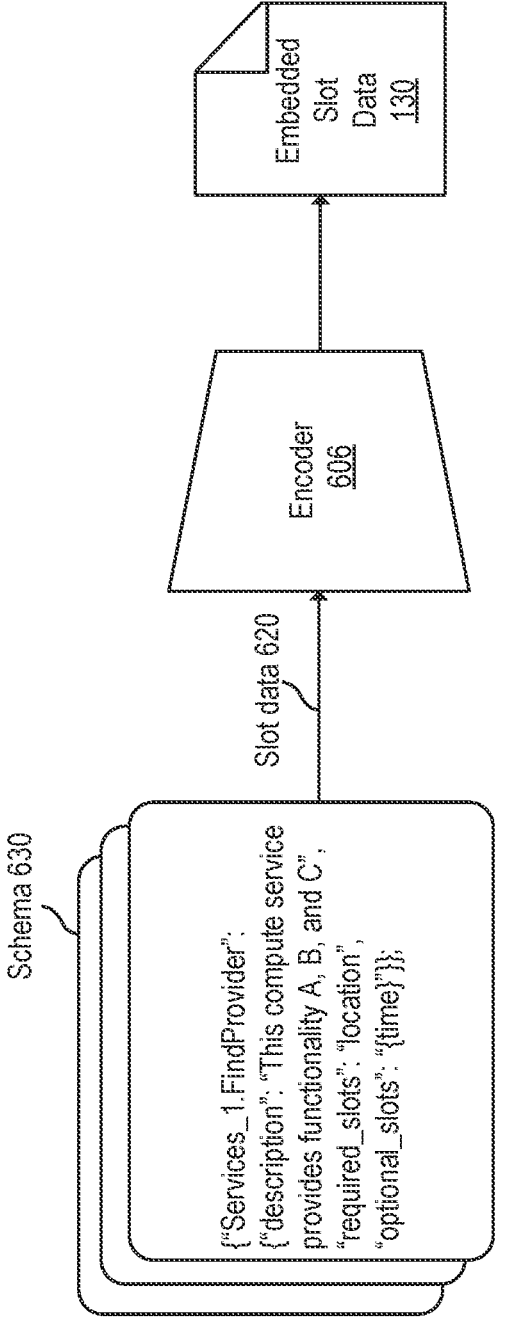
FIG. 6B depicts an example of application slot data encoding, in accordance with various aspects of the present disclosure.

FIG. 6B depicts an example of application interface slot data encoding, in accordance with various aspects of the present disclosure. The application grounding component 126 may identify the specific inputs and/or parameters that a given application interface requires. This assists the LLM(s) 260 in determining what information and/or data the application interface requires in order to function correctly. This includes recognizing required fields, optional parameters, and understanding the data types of values that can be used. Recognizing the slots for application interfaces ensures that the input query 106 is provided with application interfaces that match the specific needs of the input query 106, enhancing the usability of the retrieved applications. The slot data determined for each application interface may be embedded using an encoder model to generate the embedded slot data 130 so that this information may be used to align to the query information in order to retrieve the relevant applications 134.

In the example of FIG. 6B the schema data 630 comprises application interface definitions (e.g., data describing the different API functions, their required and optional parameters (slots), the types of input values that the different functions take, etc.).

An example of schema data 630 may be a schema describing an application interface used to find hair stylists for a given location. The schema data 630 may be:

{"Services_1.FindProvider": {"description": "Search for a hair stylist by city and optionally other attributes", "required_slots": "city", "optional_slots": "{walk-ins: yes}"}};

The slot data 620 may be programmatically determined and/or may be generated using an LLM (e.g., LLM 260). The slot data 620 may be encoded by encoder 606 to generate the embedded slot data 130. This embedded slot data 130 may be stored in memory and may be retrieved for a given input query as one of the shortlist of n relevant Applications 134. For example, the slot data 130 and the updated description embedding data 608 (FIG. 6A) may be encoded into a vector representing the API. This vector embedding may be used to align the API to the input query during retrieval. As previously described, cosine similarity or distance (or some other semantic search metric) may be used to find the API embeddings that are closest to the query embedding in a high-dimensional vector space. Upon retrieval, the retrieved API, including its modified Application description 604 and required and/or optional slot data may be added to the prompt for the LLM 260 to assist the LLM 260 in deciding whether to use the API to take some action in response to the input query 106.

Figure 6C:
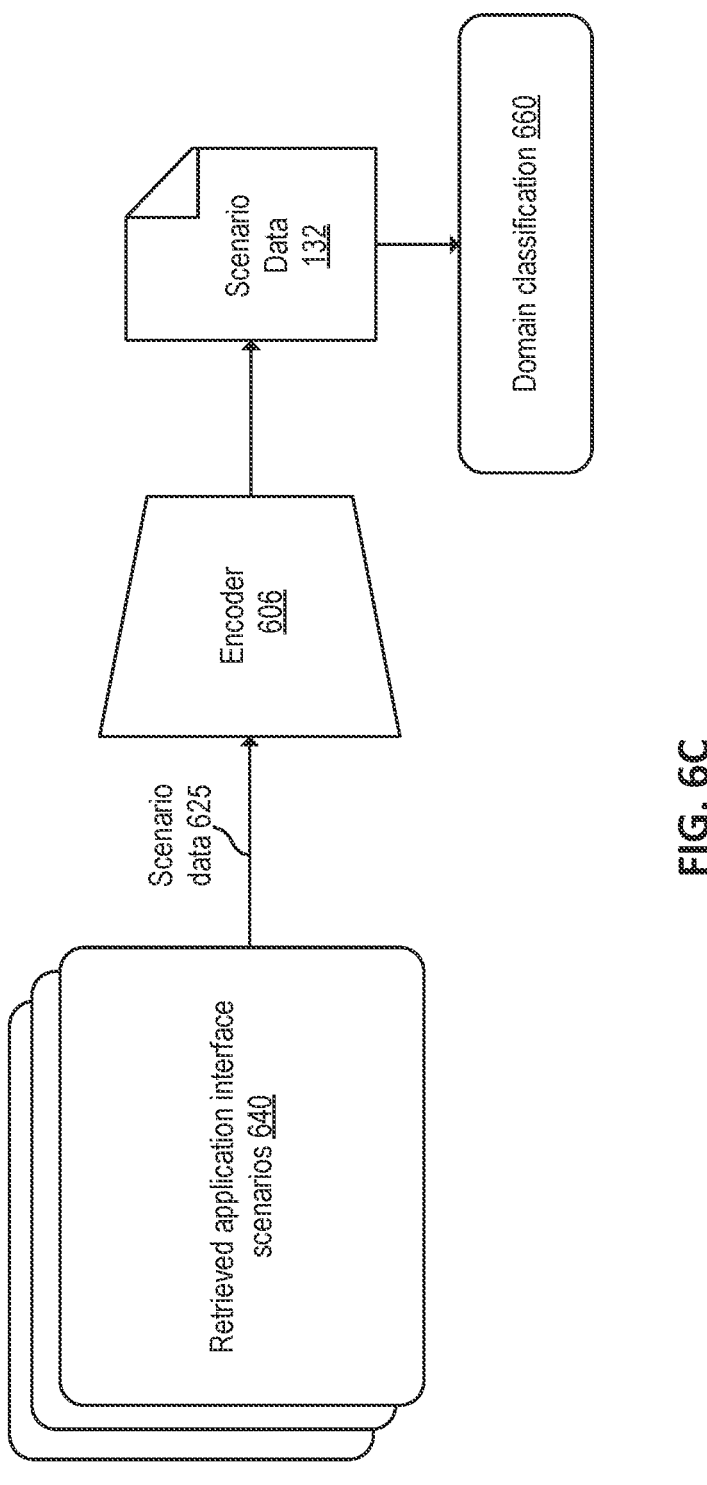
FIG. 6C depicts an example of application scenario encoding and domain classification, in accordance with various aspects of the present disclosure.

FIG. 6C depicts an example of application scenario encoding and domain classification, in accordance with various aspects of the present disclosure. The application grounding component 126 may identify scenario data 132 that provide information on how an application interface can be used in actual use-cases. This includes examples such as common scenarios of application interface usage, potential integration points of the application interface within a specific domain or application. Understanding how an application interface can be applied in different contexts assists in selecting the application interfaces that are more aligned with the goals 120 and/or domains 124 of the input query 106 and may thus be used in the retrieval task of determining the relevant applications 134 given the input query 106. In the example of FIG. 6C, a retrieved scenario 640 depicting example usage of an application interface may represent a user dialog session with a voice assistant.

For example, the application interface may be a restaurant food ordering application interface. An example retrieved scenario 640 may be:

Input: Order me a cheeseburger
Task: Cheeseburger.Order (quantity)
Input: Add pickles and ketchup
Task: Add.Condiments (pickles, ketchup)

In the example, there may be separate application interfaces or functions associated with ordering food and specifying different condiments for the food. For example, an application interface request of Cheeseburger. Order (quantity) may be used to order a cheeseburger with the quantity (e.g., an integer) passed as the required input slot/argument/parameter. A different application interface request of Add.Condiments (pickles, ketchup) may be called with the string arguments representing the desired condiments to add. This scenario data 625 may exhibit an illustration of how the particular application interface may be used with various queries (e.g., "Order me a cheeseburger" and "Add pickles and ketchup."). The scenario data 625 may be encoded by encoder 606 to generate the encoded scenario data 132. In some examples, the scenario data 132 may be used to classify a domain for the relevant application interface (via domain classification 660). Additionally, this scenario data 132, the slot data 130, and the updated description embedding data 608 (FIG. 6A) may be encoded into a vector representing the particular application interface. This vector embedding may be used to align the application interface to the input query during retrieval. As previously described, cosine similarity or distance (or some other semantic search metric) may be used to find the application embeddings that are closest to the query embedding in a high-dimensional vector space. Upon retrieval, the retrieved application interface, including its modified application description 604, required and/or optional slot data, and scenario data 132 may be added to the prompt for the LLM 260 to assist the LLM 260 in deciding whether to use the application interface to invoke the application to take some action in response to the input query 106.

Figure 7:
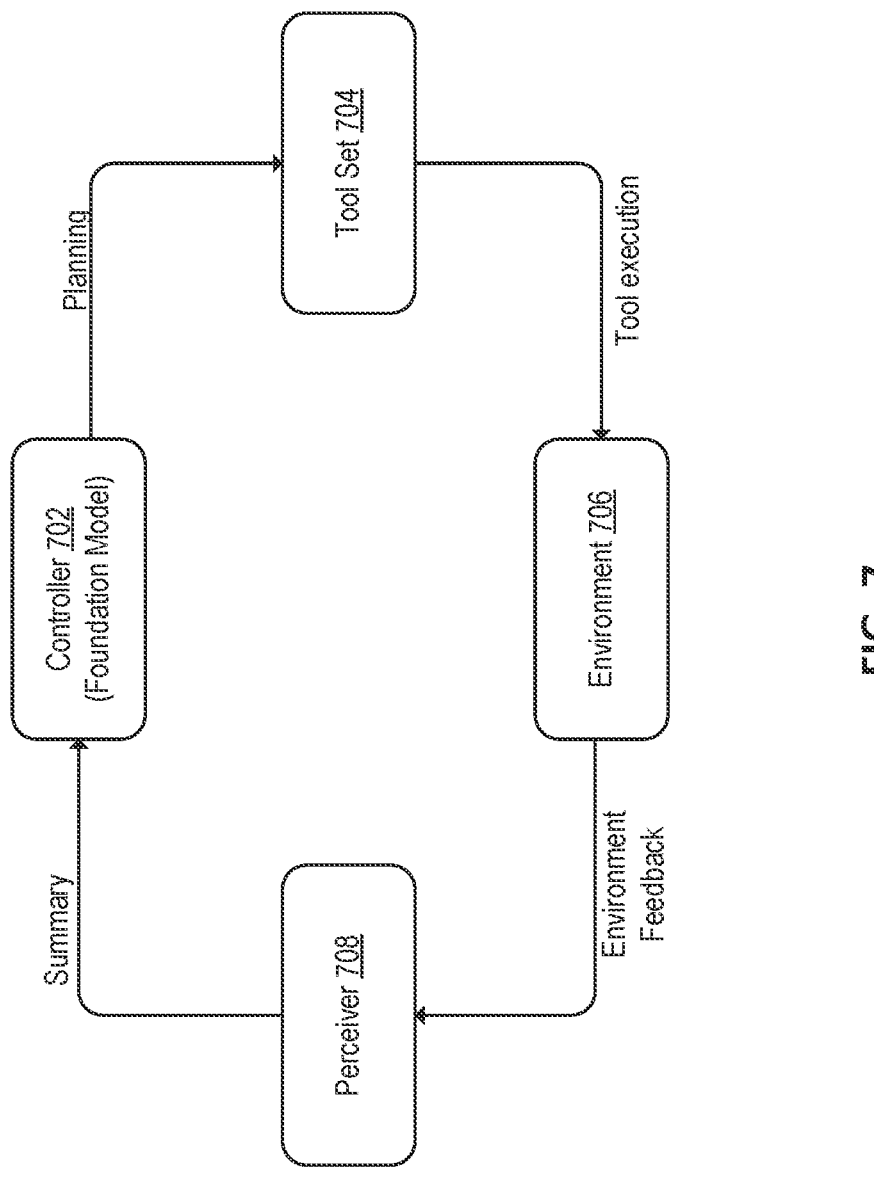
FIG. 7 depicts an example operation of a query rewriter using application tool set knowledge, in accordance with various aspects of the present disclosure.

FIG. 7 depicts an example operation of a query rewriter using application tool set knowledge, in accordance with various aspects of the present disclosure. As described above, LLM(s) 260 may be used to decompose a complex user query into a step-by-step coherent task-oriented plan. For example, the code data 122 of FIG. 3B represents a decomposition of a complex user query into a variety of tasks, where the output of a prior task may serve as the input to the next task. However, since the LLM(s) 260 are not aware of details about the available set of tools (e.g., APIs) apart from those provided as part of input prompt to the LLM(s) 260, the decomposed plan generated by the LLM(s) 260 (e.g., code data 122) may include an inaccurate plan (which may include hallucinated applications and/or their interfaces that do not exist).

In order to mitigate the risk of such hallucinations, a chain-of-thought style query rewriter that is powered by the LLM(s) 260 (e.g., the controller 702 in FIG. 7) may be used to track intermediate states (e.g., self.input and self.output in the example code data 122 of FIG. 3B). Tool set 704 may represent the available tools (e.g., application interfaces, functions, etc.) that may be used by the LLM(s) to generate a given action plan. The environment 706 may execute application interface requests included in the current iteration of the action plan and perceiver 708 may determine if valid results are generated or if one or more application interface calls and/or results are invalid. For example, if an incorrect parameter type is passed in an application interface request (e.g., a string input where the application interface requires an integer) and/or if the application interface itself is hallucinated by the LLM(s) 260, the perceiver 708 may determine that the result is invalid and may pass a summary ("The application interface Get.Restaurant.Booking ( ) does not exist") to the controller 702. The perceiver 708 may evaluate the application interface responses based on the original query itself and/or based on the goals determined for the original query. If the application interface responses do not fit with the goals, the perceiver may provide feedback indicating that the incorrect application interface has been called. The controller 702 may rewrite the query in accordance with the summary provided by the perceiver 708. The feedback loop helps to ensure that the action plan generated by the LLM(s) 260 fits the application interface pool and thus improves the precision and recall of processing by LLM(s) 260.

FIG. 8 is a flow chart illustrating an example process 800 for application shortlisting for an LLM-based natural language processing system, in accordance with embodiments of the present disclosure. The process 800 of FIG. 8 may be executed by one or more computing devices. The actions of process 800 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 800 may be described above with reference to elements of FIGS. 1-6C. Although shown in a particular order, the steps of process 800 may instead be performed in a different order. Additionally, various steps may be performed in parallel in various implementations. Further, some steps may be omitted and/or other steps may be added in accordance with API shortlisting techniques described herein.

Process 800 may begin at action 802, at which first query data may be received. The first query data may be input by a user (e.g., typed) as a prompt for a generative LLM and/or the first query data may be a transcription of user speech (e.g., a spoken request). Processing may continue at action 804, at which a first LLM (e.g., LLM(s) 260) may generate a first goal of the first query data. The first goal may be a natural language statement representing a prediction of an intent or purpose of the first query data. The LLM(s) 260 may be prompted to generate n goals for the input query in order to decompose the user request in order to determine the best tools (e.g., APIs) for performing the various subtasks implicated by the request.

Processing may continue at action 806, at which the first LLM(s) 260 may generate first code data representing the first query data. For example, the LLM(s) 260 may be prompted to generate code data (e.g., code data 122) that decomposes the first query data into a series of computer-executable tasks. In various examples, chain of thought style prompting may be used where the output of a given task may serve as the input to a sequential task (as shown in FIG. 3B). In various examples, actions 804 and 806 may occur in parallel, while in other examples these actions may occur sequentially (although not necessarily in the order shown in FIG. 8).

Processing may continue at action 808, at which an encoder may be used to generate first encoded data including a first encoded representation of the first goal and the first query data. For example, a natural language encoder (such as BERT) may be used to encode the first goal (and/or any other goals generated for the first query data) as well as the first query data. In various further examples, the first code data may also be encoded. The first encoded data may be a multi-dimensional vector semantically representing the first query data, the first goal, and/or the first code data. Such a vector may be used to search a multi-dimensional feature space for an encoded Application description that is the most semantically similar to the vector. Although not described in reference to FIG. 8, each goal may be classified as pertaining to one or more domains. Such domain data may also be encoded in the first encoded data for improved application interface retrieval.

Processing may continue at action 810, at which a first application interface may be determined based on a comparison of the first encoded data with second encoded data representing the first application interface. For example, an embedding (a multi-dimensional vector) may be generated that represents the first application description (e.g., as modified using the techniques described herein), the required and/or optional slot data for the first application interface, and/or any relevant scenario data 132 for the first application interface. In various examples, a metric to determine the similarity/distance in the embedding space may be used to find the application interface embeddings that are most similar to the query embedding (e.g., the first encoded data). For example, cosine distance and/or cosine similarity may be used.

Processing may continue at action 812, at which a second application interface may be determined based on a comparison of the first encoded data with third encoded data representing the second application interface. For example, an embedding (a multi-dimensional vector) may be generated that represents the second application description (e.g., as modified using the techniques described herein), the required and/or optional slot data for the second application interface, and/or any relevant scenario data 132 for the second application interface. In various examples, a metric to determine the similarity/distance in the embedding space may be used to find the application interface embeddings that are most similar to the query embedding (e.g., the first encoded data). For example, cosine distance and/or cosine similarity may be used.

Processing may continue at action 814, at which first prompt data may be generated including the first query data, the first data identifying the first application interface, and second data identifying the second application interface. For example, after determining that the first application interface and the second application interface are most relevant to the input first query data (using the techniques described above to retrieve the first application interface and the second application interface), information concerning the first application interface and the second application interface may be included in the first prompt data. For example, data identifying the first application interface and second application interface, required and/or optional slot data, modified Application description data, scenario data (providing example uses of the application interfaces), etc., may be included in the first prompt data together with the first query data in order to ground the LLM inferencing using the shortlist of applications (including their interfaces) that are relevant to the first query data.

Processing may continue at action 816, at which the first LLM or a second LLM may generate output data based on the first prompt data. For example, the first LLM or a second LLM may use the first prompt data as input and may generate an action plan for responding to the user request. Since the first prompt data includes descriptions of application interfaces that have been determined to be relevant to the first query data, the LLM may consider whether such application interfaces may be useful for performing one or more tasks that may be responsive to the first query data representing the user request.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a component, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method comprising:

receiving first query data comprising a first natural language input;

generating, using a first large language model (LLM), a first goal of the first query data, wherein the first LLM is fine-tuned to determine a goal of natural language input;

generating, using the first LLM, a second goal of the first query data;

determining a first domain of the first goal;

determining a second domain of the second goal;

generating, using the first LLM, first code data representing the first goal and the second goal;

generating, using an encoder, first encoded data comprising a first encoded representation of the first goal, the second goal, the first domain, the second domain, and the first code data, wherein the first encoded data generated by the encoder represents the first goal, the second goal, the first domain, the second domain, and the first code data;

determining, using a first similarity metric, a first application for performing one or more tasks in response to the first natural language input, wherein the first application is determined by analyzing the first encoded data with respect to second encoded data comprising a representation of a description of the first application, wherein the second encoded data represents the description of the first application;

determining, using the first similarity metric, a second application for performing the one or more tasks in response to the first natural language input, wherein the second application is determined by comparing the first encoded data to third encoded data comprising a representation of a description of the second application, wherein the third encoded data represents the description of the second application;

generating first prompt data comprising first data representing the first application, second data representing the second application, and third data representing the first query data; and generating, by the first LLM using the first prompt data, first output data in response to the first natural language input.

2. The computer-implemented method of claim 1, further comprising:

generating second prompt data comprising the first query data, second query data comprising an example query, and first example code comprising a plurality of tasks associated with the example query;

generating, by the first LLM using the second prompt data, the first code data, wherein the first code data comprises a third application;

sending fourth data to the third application, the fourth data comprising a first parameter type, wherein the first parameter type is determined from the first query data;

determining that a response from the third application is invalid due to the first parameter type being invalid for the third application; and generating third prompt data indicating that the third application is invalid for responding to the first query data.

3. The computer-implemented method of claim 1, further comprising:

generating, using the encoder, the second encoded data further comprising a representation of required input parameters and optional input parameters for the first application; and determining that the first query data describes the required input parameters and optional input parameters by analyzing the second encoded data with respect to the first encoded data.

4. A method comprising:

receiving first query data;

generating, using a first language model (LM), a first goal of the first query data;

generating, using the first LM, first code data representing the first query data;

generating, using an encoder, first encoded data comprising a first encoded representation of the first goal and the first query data in an embedding space;

determining a first application based at least in part on analysis of the first encoded data with respect to second encoded data representing the first application, wherein the second encoded data represents the first application in the embedding space;

determining a second application based at least in part on analysis of the first encoded data with respect to third encoded data representing the second application, wherein the third encoded data represents the second application in the embedding space;

generating first prompt data comprising the first query data, first data identifying the first application, and second data identifying the second application; and generating output data based at least in part on the first prompt data.

5. The method of claim 4, further comprising:

determining exemplar data comprising second query data and a code representation of the second query data; and generating, using the first LM, the first code data based at least in part on second prompt data comprising the first query data and the exemplar data.

6. The method of claim 4, further comprising:

determining a first text description of the first application;

generating second prompt data comprising the first text description and instructions to rewrite the first text description; and generating, by the first LM or a second LM, a second text description of the first application.

7. The method of claim 6, further comprising:

generating, by the first LM or a second LM, data representing input parameters of the first application; and generating the second encoded data representing the first application, wherein the second encoded data comprises representations of the second text description and the data representing input parameters of the first application.

8. The method of claim 7, further comprising:

determining similarity data representing a similarity between the first encoded data and the second encoded data using a first vector similarity metric; and determining that the first application corresponds to the first query data based at least in part on the similarity data.

9. The method of claim 4, further comprising:

determining a first input parameter of the first application;

determining a first data type of the first input parameter;

determining a second input parameter of the first application, wherein the second input parameter is classified as an optional input parameter;

determining a second data type of the second input parameter;

generating the second encoded data comprising a representation of the first input parameter, the first data type, the second input parameter and the second data type; and determining the first application based at least in part on a correspondence between information specified in the first query data and the second encoded data.

10. The method of claim 4, further comprising:

determining a first list of applications for the first query data based at least in part on a comparison of the first query data to a respective embedding for each application in the first list of applications; and determining a subset of the first list of applications based at least in part on analysis of the first encoded data with respect to the second encoded data and analysis of the first encoded data with respect to the third encoded data, the subset comprising the first application and the second application.

11. The method of claim 4, further comprising:

sending a first request to the first application;

receiving first result data based at least in part on the first request;

determining that the first result data is invalid; and generating second query data indicating that the first result data from the first request sent to the first application is invalid.

12. The method of claim 4, further comprising:

generating, using the first LM, a second goal of the first query data;

generating, using the first LM or a first classifier, a first domain classification of the first goal;

generating, using the first LM or the first classifier, a second domain classification of the second goal;

generating third data representing the first domain classification of the first goal; and generating fourth data representing the first domain classification of the first goal, wherein the first encoded data further comprises the third data and the fourth data.

13. A system comprising:

at least one processor; and non-transitory computer-readable memory storing instructions that, when executed by the at least one processor, are effective to:

receive first query data;

generate, using a first language model (LM), a first goal of the first query data;

generate, using the first LM, first code data representing the first query data;

generate, using an encoder, first encoded data comprising a first encoded representation of the first goal and the first query data in an embedding space;

determine a first application based at least in part on analysis of the first encoded data with respect to second encoded data representing the first application, wherein the second encoded data represents the first application in the embedding space;

determine a second application based at least in part on analysis of the first encoded data with respect to third encoded data representing the second application, wherein the third encoded data represents the second application in the embedding space;

generate first prompt data comprising the first query data, first data identifying the first application, and second data identifying the second application; and generate output data based at least in part on the first prompt data.

14. The system of claim 13, the non-transitory computer-readable memory storing further instructions that, when executed by the at least one processor, are further effective to:

determine exemplar data comprising second query data and a code representation of the second query data; and generate, using the first LM, the first code data based at least in part on second prompt data comprising the first query data and the exemplar data.

15. The system of claim 13, the non-transitory computer-readable memory storing further instructions that, when executed by the at least one processor, are further effective to:

determine a first text description of the first application;

generate second prompt data comprising the first text description and instructions to rewrite the first text description; and generate, by the first LM or a second LM, a second text description of the first application.

16. The system of claim 15, the non-transitory computer-readable memory storing further instructions that, when executed by the at least one processor, are further effective to:

generate, by the first LM or a second LM, data representing input parameters of the first application; and generate the second encoded data representing the first application, wherein the second encoded data comprises representations of the second text description and the data representing input parameters of the first application.

17. The system of claim 16, the non-transitory computer-readable memory storing further instructions that, when executed by the at least one processor, are further effective to:

determine similarity data representing a similarity between the first encoded data and the second encoded data using a first vector similarity metric; and determine that the first application corresponds to the first query data based at least in part on the similarity data.

18. The system of claim 13, the non-transitory computer-readable memory storing further instructions that, when executed by the at least one processor, are further effective to:

determine a first input parameter of the first application;

determine a first data type of the first input parameter;

determine a second input parameter of the first application, wherein the second input parameter is classified as an optional input parameter;

determine a second data type of the second input parameter;

generate the second encoded data comprising a representation of the first input parameter, the first data type, the second input parameter and the second data type; and determine the first application based at least in part on a correspondence between information specified in the first query data and the second encoded data.

19. The system of claim 13, the non-transitory computer-readable memory storing further instructions that, when executed by the at least one processor, are further effective to:

determine a first list of applications for the first query data based at least in part on a comparison of the first query data to a respective embedding for each application in the first list of applications; and determine a subset of the first list of applications based at least in part on analysis of the first encoded data with respect to the second encoded data and analysis of the first encoded data with respect to the third encoded data, the subset comprising the first application and the second application.

20. The system of claim 13, the non-transitory computer-readable memory storing further instructions that, when executed by the at least one processor, are further effective to:

send a first request to the first application;

receive first result data based at least in part on the first request;

determine that the first result data is invalid; and generate second query data indicating that the first result data from the first request sent to the first application is invalid.

\* \* \* \* \*